May 29, 1951 H. W. JEWELL 2,554,705
METHOD OF AND APPARATUS FOR DRYING CERAMIC PIPES
Filed May 9, 1947 2 Sheets-Sheet 1

INVENTOR.
Howard W. Jewell
BY
ATTORNEY

May 29, 1951 H. W. JEWELL 2,554,705
METHOD OF AND APPARATUS FOR DRYING CERAMIC PIPES
Filed May 9, 1947 2 Sheets-Sheet 2
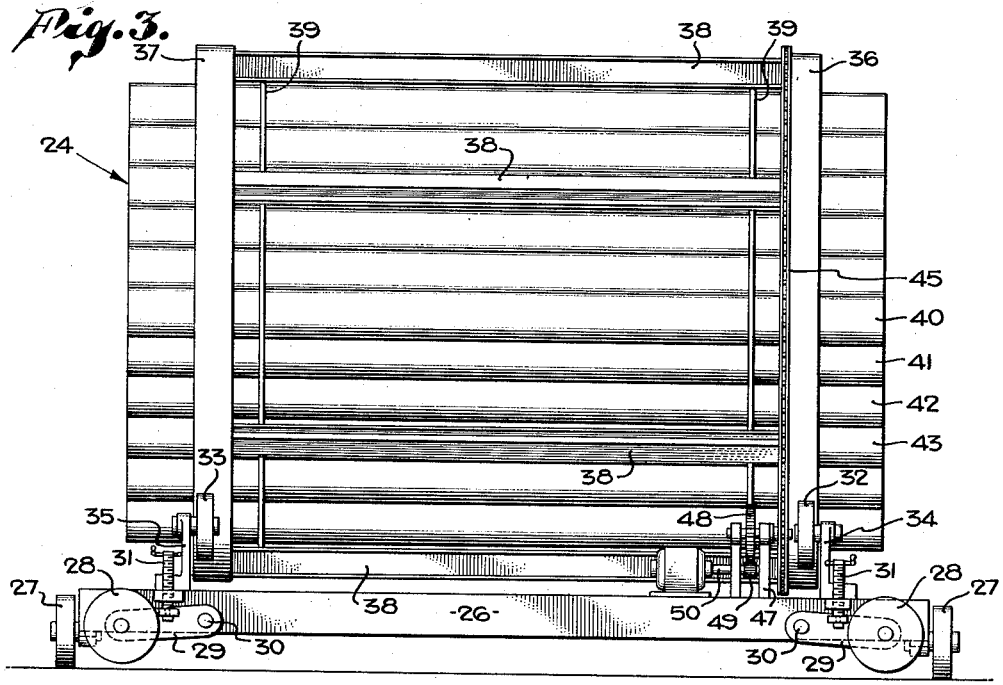
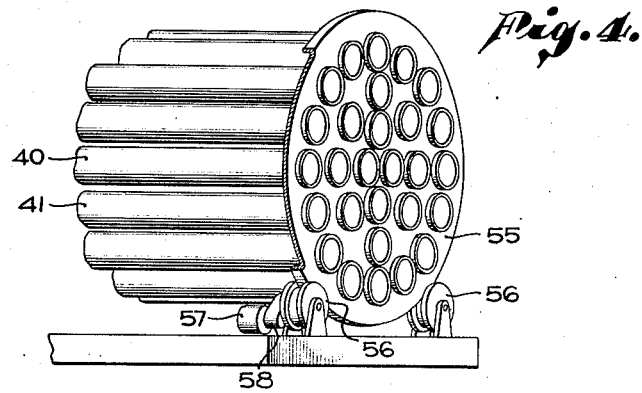
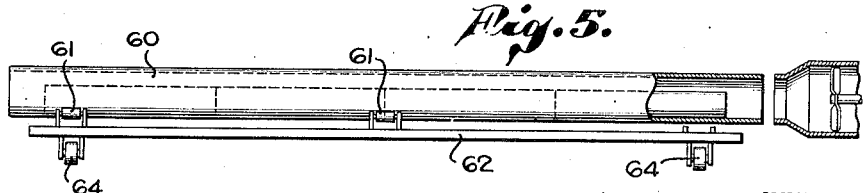
INVENTOR.
Howard W. Jewell
BY
ATTORNEY Patented May 29, 1951

2,554,705

UNITED STATES PATENT OFFICE 2,554,705

METHOD OF AND APPARATUS FOR DRYING CERAMIC PIPE

Howard W. Jewell, Los Angeles, Calif., assignor to Pacific Clay Products, Los Angeles, Calif., a corporation of California Application May 9, 1947, Serial No. 746,958

4 Claims. (Cl. 34—21)

This invention relates to improvements in the ceramic arts and is particularly directed to novel methods of handling pipe and conduit during drying thereof.

Although the apparatus and methods of the present invention are capable of being used in the handling of various pipe and conduit, they are particularly applicable to the handling of pipe and conduit made from ceramic compositions such as, for example, clay compositions or mixtures containing hydratable components such as hydraulic cements, the latter ingredient being generally combined with or intermixed with asbestos, siliceous materials or fillers, etc.

In order to simplify description, reference will be particularly directed to the application of the invention to the manufacture of clay composition pipe and conduit. Clay pipe and conduit are generally made by extruding a clay mass through a die. The clay mass is plastic and contains appreciable quantities of uncombined or free water. The formed or extruded pipe in its green or unburned state is tender and can not be handled excessively without losing its shape, breaking or other disfigurement. Ordinarily, the drying of this green pipe is a burdensome, time-consuming, space-occupying procedure. It is necessary to reduce the moisture content of the formed pipe to a relatively low figure before the pipe in its green state can be handled, glazed, stacked and burned in a tunnel, down-draft or other suitable kiln. Ordinarily, lengths of pipe are stood on end and carted through driers where they are subjected to heated air. Because of the weight of the clay body, the pipe lengths are short, lengths exceeding about three feet being incapable of supporting their own weight without buckling.

The present invention not only departs from prior methods of drying and handling formed pipe and conduit but in addition permits the manufacture of long lengths of pipe, that is, pipe sections which are six, eight or even ten feet long. The availability of clay pipe in long sections reduces the cost of clay pipe enormously since it eliminates a great many joints and the labor cost entailed in making such joints.

Moreover, the method of the present invention gives rise to pipe sections which are stronger, have less tendency to split or fracture, which are more uniform in diameter and contour, are less absorptive and have a denser, more closely knit structure.

These various highly desirable objectives are attained by a method of procedure which involves the placement of a formed unburned ceramic composition pipe or conduit within a hollow cylindrical chamber, the length of pipe or conduit resting upon the smooth, internal wall surfaces of the chamber. This chamber is then rotated about an axis coincidental with or parallel to the longitudinal axis of such chamber, thereby causing the formed pipe or conduit to rotate or roll, areas of contact between the pipe and the cylindrical walls of the chamber changing constantly during such rolling. While the length of unburned pipe is thus being rolled and rotated, heat is supplied to the chamber for the purpose of abstracting and removing free moisture from the formed pipe. This method of procedure expedites drying very materially and gives rise to lengths of dry pipe capable of being readily handled, slip glazed, or otherwise treated and burned.

It is an object of the present invention, therefore, to disclose and provide improved methods of manufacturing pipe and conduit in long sections.

A further object of the invention is to disclose and provide a novel method of drying formed pipe and conduit.

A still further object of the invention is to disclose and provide novel means and devices whereby the manufacture and drying of formed ceramic pipe may be greatly expedited.

These and other objects, advantages and results capable of being attained by the present invention will be more readily understood from the detailed description given hereinafter of certain exemplary forms and procedures. During such description reference will be had to the appended drawings, in which:

Fig. 3 is a side elevation of the unit shown in Fig. 2.

Fig. 4 is a perspective view of one end portion of a modified form of unit.

Fig. 5 is a side elevation of a still further modification.

As previously stated, clay composition pipe and conduit are generally made by extruding a clay composition through a die. Pipe-forming devices employing augers or plungers are well known in the art (see, for example, Patent No. 1,808,964). The clay composition may be deaerated before extrusion.

Figure 1:
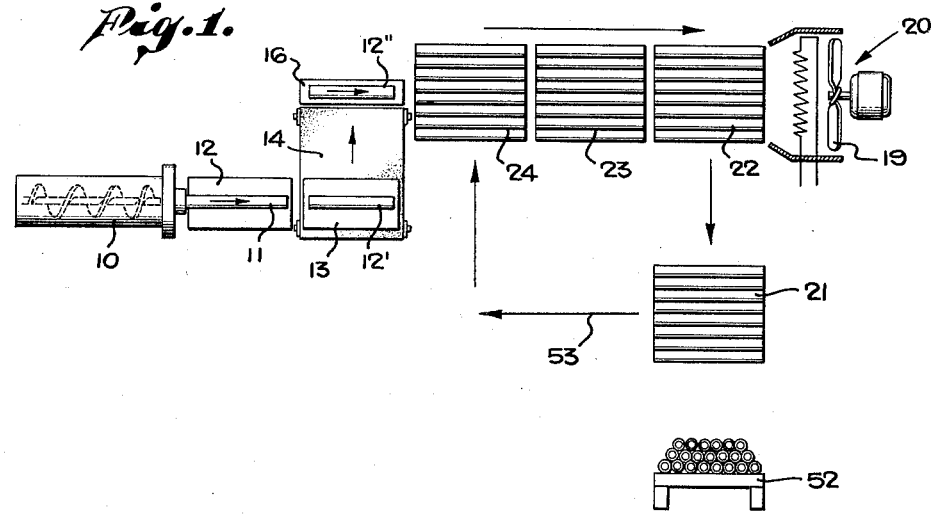
Fig. 1 is a schematic plan view of an arrangement of elements capable of being used in conjunction with an auger machine for the ready manufacture and drying of long lengths of clay pipe.

As shown in Fig. 1, a suitable extrusion device 10 provided with a horizontally directed die is arranged to discharge a pipe or conduit 11 upon a cutoff table 12 and onto a sliding table 13 above the conveyor 14. A long section of pipe 12' cut by suitable means, not illustrated but well known in the art, from the extruded length 11 can then be carried by the conveyor 14 onto a transfer table 16.

Figure 2:
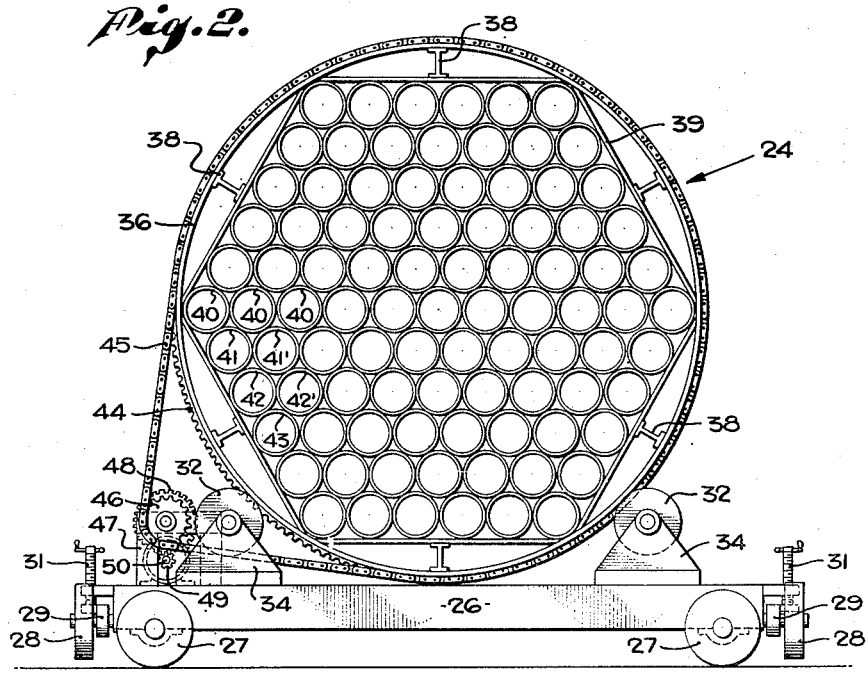
Fig. 2 is an end view of one of the drying units.

Devices for receiving the lengths of pipe, such as 12' and 12'', are indicated at 21, 22, 23 and 24. One form of such pipe-receiving device is illustrated in Figs. 2 and 3 and generally stated comprises a series or nest of cylindrical hollow chambers, each of which is capable of receiving a length of pipe, the entire nest being capable of rotation. In Fig. 1 the various units 22, 23 and 24 are shown in alignment with the transfer means 16 and with a source of heat at the opposite end, such source of heat being generally indicated at 20 and including a fan 19 which directs the heated air axially along and through the various units 22, 23 and 24.

By referring to Figs. 2 and 3, it will be seen that the unit 24 comprises a carrier frame or base 26 mounted upon wheels 27 and also provided with wheels 28 mounted upon axes at right angles to the axes of the wheels 27. The wheels 28 may be carried upon axles connected to an arm 29 pivoted at 30, the entire arm together with the wheel 28 being capable of being raised or lowered by hydraulic or mechanical means so that the direction of movement of the entire carrier frame 26 may be changed. For purposes of simplification, the wheels 28 and lever arm 29 are shown operated by means of a screw arrangement 31 but as previously stated, hydraulic means may be substituted for such simple mechanical means.

Rotatably mounted upon the carrier frame 26 as upon rollers 32 and 33 mounted in suitable standards 34 and 35 is an assembly including rings 36 and 37 connected together by means of light I-beams 38. This cage (composed of the rings 36 and 37 and interconnecting I-beams) may also contain straps 39 which retain within such framework a large number of hollow, cylindrical, tubular members such as 40, 41, 42, 43, etc. These various members 40—43 are nested within the cage previously described. Each of such members may be made of sheet metal and preferably has smooth, internal, wall surfaces defining a cylindrical chamber. It is to be noted that the members are not provided with internally extending flanges or other obstructions so that the ends of each of the chambers are unrestricted and open.

Means are provided for rotating the entire cage or framework and each of the members contained therein. Such means may comprise a series of teeth or serrations 44 formed in an upstanding flange on the ring 36, a chain 45 passing over said serrations and a sprocket 46 mounted upon a shaft journaled in a framework 47 carried by the carrier frame 26 and suitable gearings 48 driven by a pinion 49 mounted upon a crank shaft 50. Upon rotation of the crank shaft 50 the entire nest of chambers is caused to rotate. It is understood that instead of employing manually operated means, electrically controlled means for imparting rotation to the entire nest may be used. Furthermore, instead of employing a chain drive such as has been described, rotation may be imparted to the nest by simply applying power to one of the supporting rollers, such as roller 33.

The internal diameter of each of the hollow cylindrical members 40—43 and the length of each such member is greater than the external diameter and length of a formed pipe or conduit which is to be dried. Each such nest or unit, such as the unit 24, may be loaded from the conveyor 14 and transfer table 16 by moving the entire carrier frame so as to position the transfer table 16 opposite an unoccupied or empty chamber. For example, the horizontal row of members, identified by the numerals 40, 40', 40'', etc., may first be loaded, then the next horizontal row including 41, 41', etc., may be loaded, the end of conveyor 14 and the transfer mechanism 16 being raised or lowered in accordance with the level of the tubes or chambers which are being filled.

Another form of loading may comprise loading the unit while it is being slowly rotated, the various chambers 40, 41, 42, 43, forming an external approximate circle which can be loaded while the carrier frame 26 is stationary and the nest is slowly revolved. After completing the loading of an external circle, the carrier frame 26 may be advanced transversely a short distance so as to place the transfer mechanism in approximate alignment with the chamber 40', whereupon slow rotation of the entire nest will permit the transfer mechanism to fill chambers 40', 41', 42', etc. These operations may be repeated until the entire unit 24 is completely filled with moisture-containing, formed lengths of pipe.

It will be noted that the various units 22, 23 and 24 are in alignment so that heated air from the heater 20 passes therethrough. While unit 24 is being loaded the formed pipe in units 22 and 23 is being dried. During such drying these units or nest of chambers are being slowly rotated. During such rotation, the formed pipe contained in the various chambers is in rolling contact with the internal surfaces of the chambers. The heated air, therefore, passes through the chambers and around the various pieces of pipe longitudinally, preferably at high velocity.

The number of units in alignment and subjected to the hot air from the heater 20 will vary but is generally arranged so that the pipe in unit 22 is drying at the time that loading of unit 24 is completed. At this stage in the operation the unit 22 may be moved transversely into the position occupied by unit 21. In the meantime, unit 21 has been discharged or relieved of its load of dried pipe which in the schematic representation is shown piled upon a skid 52. It is to be understood that the pipe may be trimmed, glazed or subjected to other operations before it is placed upon the skids, or instead the pipe may be placed upon the skid and taken to another portion of the plant for such finishing or glazing operations.

When unit 24 has been completely filled, unit 21 is moved longitudinally, as indicated by the arrow 53, so as to permit unit 22 to be moved transversely into the position occupied by unit 21 on the drawing. Units 23 and 24 are then moved longitudinally into close proximity to the heater 20 while unit 21 is moved into loading position.

It will be noted, therefore, that a relatively small number of units carrying a large quantity of pipe can be cyclicly employed in a small floor space.

Instead of employing a unit in which the various cylindrical hollow members are nested in self-supporting relation, an arrangement such as is shown in Fig. 4 may be employed. The drying unit there illustrated comprises two or more transverse, circular head plates such as 55, each of the head plates being perforated so as to receive and hold the sheet metal members 40, 41, which form the drying chambers. The circular edges of the head plates 55 may rest upon grooved rollers 56 and at least one of such rollers may be driven by a motor 57 and suitable gearing 58. Since the various tubular members form circular arrangements, a unit of this sort may be readily loaded by slowly rotating the unit while one of the circular rows is in alignment with the transfer mechanism 16.

As previously stated, the internal diameter of each of the members 40—43 is greater than the external diameter of a pipe or conduit being manufactured. In actual practice it has been found that a member having a 10 inch internal diameter will readily receive and process pipe having external diameters of 8, 6 and 4 inches. It may be noted that when clay pipe are being processed in this manner it is desirable to maintain the moisture content of the clay composition between about 14 per cent and 22 per cent, this being somewhat below the normal moisture content of clay compositions. It is to be understood that this reference to moisture content contemplates free moisture and not the combined water which is ordinarily not removed from the clay until temperatures appreciably above 212° F. are reached.

Attention is also called to the fact that while the pipe is drying in units 22 and 23, such pipe is being rolled and such rolling has been found highly beneficial since it has a tendency to increase the strength and density of the pipe whereby pipe of lower absorption and lower tendency to split, fracture or crack is attained. Moreover, since rolling contact takes place, drying shrinkage is unimpeded. The resulting pipe, when originally extruded through a circular die, maintain true concentricity. When conduit of polygonal form is extruded through the die (such as conduit having an octagonal form in cross section), the rolling does not destroy the desired octagonal cross section but only tends to round the corners of the conduit.

Although the units 21—24 previously described include chambers each of which is capable of receiving a single length of pipe section, the mode of operation of this invention may be carried out in units or chambers having a length capable of receiving four, six or even eight pipe sections. A simple single chamber unit of this character is illustrated in Fig. 5. As there shown, the machine comprises a long, hollow, cylindrical member 60 mounted for axial rotation upon rollers 61 carried by the carrier frame 62. The frame is mounted upon wheels 64 so that it may be moved in a direction perpendicular to the longitudinal axis of the chamber when desired. The unit illustrated is capable of receiving four sections of pipe. These sections of pipe may be loaded from one end, each section pushing against the adjoining section until all of them are in alignment within the chamber. During loading, the entire chamber may be rotated. The chamber may then be moved upon the wheel 64 into position in alignment with a source of heated air which is blown through the chamber while the pipe sections are rolling along the inner surfaces of such chamber. At the completion of the drying operation, the entire charge of dried pipe sections may be removed by means of an hydraulically operated ram or other extensible plunger means.

The method of the present invention may also be carried out in a device of the character shown in Fig. 5, such device being of sufficient length so as to permit the continual discharge of dried pipe sections from that end of the hollow rotating chamber opposed to the loading end. Heated gases can be supplied at the discharge end of such chamber so that the pipe is progressively subjected to increasing temperatures as it moves from the inlet to the discharge end, rotation and rolling taking place continuously during such axial progress.

Those skilled in the art will readily appreciate the increased facilities and improved results which flow from the use of the invention hereinbefore described. All changes and modifications coming within the scope of the appended claims are embraced thereby.

I claim:

1. An apparatus for drying formed clay pipe, comprising: a carrier frame provided with a plurality of parallel, hollow, cylindrical open-ended members held in close proximity to each other by such frame, each of said members having a smooth internal surface defining an open-ended chamber adapted to receive a formed clay pipe; means for controllably rotating the entire carrier frame and members held thereby about a common axis parallel to the longitudinal axes of the members; and means for supplying a blast of heated gases to one of the open ends of each of the members to blow a blast of heated gases into the same end of each of the members and through all of the members simultaneously.

2. An apparatus of the character stated in claim 1, wherein the carrier frame is mounted upon a base provided with means for moving said base and carrier in a horizontal plane.

3. An apparatus for drying formed clay pipe, comprising: a carrier frame provided with a plurality of parallel, hollow, cylindrical open-ended members held in close proximity to each other by such frame, each of said members having a smooth internal surface defining an open-ended chamber adapted to receive a formed clay pipe; means for controllably rotating the entire carrier frame and members held thereby about a common axis parallel to the longitudinal axes of the members; means for feeding freshly formed clay pipe into close proximity to the open ends of members at one end of the frame, said feeding means being selectively, vertically adjustable; and means for supplying a current of heated gases to the open ends of said members at the other end of the frame.

4. A method of drying a large number of lengths of pipe made from ceramic composition within a compact space, which comprises: feeding freshly formed lengths of ceramic composition pipe into one end of a plurality of parallel, closely adjacent cylindrical open-ended chambers of larger cross sectional area than the pipe in a feeding zone; supplying a current of heated gases to the opposite ends of all of said chambers simultaneously; simultaneously rotating the plurality of chambers about one common axis parallel to the axes of said chambers; advancing the lengths of pipe longitudinally through the chambers from the feeding zone to the source of heated gases while continuing to supply to and pass heated gases through all of said chambers; and continuing the rotation of the plurality of chambers about the common axis while the pipe is within said chambers.

HOWARD WM. JEWELL.

REFERENCES CITED

The following references are of record in the file of this patent:

UNITED STATES PATENTS

| Number | Name | Date |
|---|---|---|
| 798,443 | Odell | Aug. 29, 1905 |
| 1,005,335 | Seigle | Oct. 10, 1911 |
| 1,822,158 | Majer | Sept. 8, 1931 |
| 2,039,129 | Vance et al. | Apr. 28, 1936 |
| 2,087,697 | Molins | July 20, 1937 |
| 2,103,086 | Miller | Dec. 21, 1937 |
| 2,248,490 | Chamberlain et al. | July 8, 1941 |
| 2,274,426 | Miller | Feb. 24, 1942 |